US012618679B2

(12) United States Patent
     Henderson

(10) Patent No.: US 12,618,679 B2
(45) Date of Patent: May 5, 2026

(54) TERRAIN REFERENCED NAVIGATION SYSTEM

(71) Applicant: Atlantic Inertial Systems Limited, Plymouth (GB)

(72) Inventor: Geoffrey Thomas Henderson, Yelverton (GB)

(73) Assignee: ATLANTIC INERTIAL SYSTEMS LIMITED, Plymouth (GB)

( * ) Notice: Subject to any disclaimer, the term of this patent is extended or adjusted under 35 U.S.C. 154(b) by 9 days.

(21) Appl. No.: 18/538,225

(22) Filed: Dec. 13, 2023

(65) Prior Publication Data

US 2024/0200948 A1     Jun. 20, 2024

(30) Foreign Application Priority Data

Dec. 16, 2022     (EP) ..................................... 22275163

(51) Int. Cl.
     G01C 21/00          (2006.01)
     G01C 5/00          (2006.01)
                 (Continued)

(52) U.S. Cl.
     CPC ......... G01C 21/1656 (2020.08); G01C 5/005 (2013.01); G06V 20/17 (2022.01);
                 (Continued)

(58) Field of Classification Search
     CPC .. G01C 21/1656; G01C 5/005; G01C 21/005; G01C 23/00; G01C 23/005; G01C 5/06;
                 (Continued)

(56) References Cited

U.S. PATENT DOCUMENTS

| 6,208,936 | B1 | 3/2001 | Minor et al. |
| 6,366,835 | B1 | 4/2002 | Henderson |

(Continued)

FOREIGN PATENT DOCUMENTS

WO          2018165315 A1     9/2018

OTHER PUBLICATIONS

European Search Report for Application No. 22275163.8, mailed Jun. 22, 2023, 8 pages.

(Continued)

*Primary Examiner* — Shardul D Patel
(74) *Attorney, Agent, or Firm* — CANTOR COLBURN LLP

(57)          ABSTRACT

A navigation system for an aircraft includes a microelectro-mechanical systems inertial measurement unit (MEMS-IMU), a camera that captures, over time, a series of images of the terrain below the aircraft, a terrain map comprising terrain elevation data, an inertial navigation system (INS) and an optical terrain-referenced navigation unit (O-TRN). The INS generates a first position estimate based on one or more signals output by the MEMS-IMU. The O-TRN identifies a terrain feature in an image captured by the camera, derives a terrain height estimate of the terrain feature, and generates a second position estimate based on a comparison between the terrain height estimate and terrain elevation data extracted from the terrain map. The navigation system generates a third position estimate based on the first position estimate and the second position estimate.

14 Claims, 3 Drawing Sheets

(51) Int. Cl.

| | |
|---|---|
| *G01C 21/16* | (2006.01) |
| *G06V 20/17* | (2022.01) |
| *G08G 5/50* | (2025.01) |
| *G08G 5/55* | (2025.01) |
| *G08G 5/74* | (2025.01) |

(52) U.S. Cl.
CPC .................. *G08G 5/50* (2025.01); *G08G 5/55* (2025.01); *G08G 5/74* (2025.01)

(58) Field of Classification Search
CPC .............. G01C 21/165; G01C 21/3826; G01C 21/3848; G01C 21/3852; G01C 21/00; G06V 20/17; G08G 5/50; G08G 5/55; G08G 5/74
USPC ........................................................ 701/472
See application file for complete search history.

(56) References Cited

U.S. PATENT DOCUMENTS

| | | | | |
|---|---|---|---|---|
| 7,962,285 | B2 | 6/2011 | Breed | |
| 11,280,617 | B2 | 3/2022 | Lam | |
| 2008/0243383 | A1* | 10/2008 | Lin | .................... G01C 21/1652 |
| | | | | 342/357.53 |
| 2018/0259341 | A1* | 9/2018 | Aboutalib | .......... G01C 21/1652 |

OTHER PUBLICATIONS

Communication under Rule 71(3) EPC for Application No. 22275163.8; Date of Mailing Mar. 23, 2026 (37 pages).

Rosiek et al. "Exploiting global positioning system and inertial measurement unit-controlled image sensors" 26th AIPR Workshop: Exploiting New Image Sources and Sensors. vol. 3240. SPIE, 1998. (10 pages).

\* cited by examiner

TERRAIN REFERENCED NAVIGATION SYSTEM

CROSS REFERENCE TO RELATED APPLICATIONS

This application claims priority to European Patent Application No. 22275163.8 filed Dec. 16, 2022, the entire contents of which is incorporated herein by reference.

TECHNICAL FIELD

The present disclosure relates to the field of navigation systems, particularly navigation systems for use on aircraft.

BACKGROUND

Inertial Navigation Systems (INS), which are in service on a number of land, sea and air vehicles, use inertial measurement sensors (e.g. gyroscopes, accelerometers, etc.) to provide a navigation solution based on the principles of dead reckoning. However, position estimates obtained from INSs typically drift over time due to the accumulation of errors in the outputs of accelerometers and gyroscopes. In order to mitigate this to some extent, high quality, e.g. navigation grade INSs typically require the use of high-precision, low-drift inertial sensors which are generally physically large and expensive to manufacture.

In order to further counteract (or correct for) the drift of INS position estimates they are often used in conjunction with other sources of position estimate such as Global Navigation Satellite Systems such as GPS, Galileo, GLO-NASS, etc. However, satellite-based navigation systems are not reliable: signals can be jammed, spoofed, blocked, etc. which can lead to problems with navigation systems that rely too heavily on these satellite-based navigation systems.

In view of this, some navigation systems use terrain-referenced navigation systems (TRN) in conjunction with an INS in order to counteract (or correct for) INS drift, particularly though not exclusively on aircraft. Such systems typically use radar altimeters to estimate terrain elevation beneath an aircraft. Measured terrain elevation estimates are then correlated with stored terrain elevation data (e.g. a Digital Terrain Elevation Database, DTED) along the aircraft's travel path in order to produce a navigation solution.

SUMMARY

When viewed from a first aspect this disclosure provides a navigation system for an aircraft. The system includes: a microelectromechanical systems inertial measurement unit (MEMS-IMU); a camera arranged to capture, over time, a series of images of the terrain below the aircraft; a terrain map comprising terrain elevation data; an inertial navigation system, INS, arranged to generate a first position estimate based on one or more signals output by the MEMS-IMU; and an optical terrain-referenced navigation unit (O-TRN). The O-TRN is configured to: identify a terrain feature in an image captured by the camera; derive a terrain height estimate of the terrain feature; and generate a second position estimate based on a comparison between the terrain height estimate and terrain elevation data extracted from the terrain map. wherein the navigation system is configured to generate a third position estimate based on the first position estimate and the second position estimate.

Inertial MEMS sensors are typically physically smaller than, and significantly cheaper to manufacture than more accurate inertial sensors like ring laser gyroscopes, fibre optic gyroscopes, etc. However, inertial MEMS sensors can suffer from significant errors (e.g. bias errors, scale factor errors, etc.), which can cause position estimates derived from inertial MEMS sensor outputs to drift substantially over time, thereby potentially reducing their usability in navigation systems where accuracy is a key concern. Various techniques have been used to help correct or keep track of the errors in INSs, e.g. using other sources of positional information like GNSS positioning systems. However, GNSS information can become unavailable or unreliable in certain circumstances and so it is desirable to be able to correct the INS system be other means when required. In order to compensate for the errors, the present disclosure combines a position estimate from a MEMS-based INS with a second position estimate from an O-TRN, thereby enabling the system to provide a third, more accurate position estimate for an aircraft. Thus, the present disclosure may provide a navigation system that is physically small and inexpensive to manufacture and that still provides a navigation solution of acceptable accuracy. This may enable the navigation system to be particularly suitable in applications where there is limited space or where added weight is undesirable, e.g. light aircraft like drones and helicopters, though it will be appreciated that the navigation system is equally suitable for other types of aircraft e.g. larger passenger and/or freight aircraft, etc.

Furthermore, the present disclosure provides a navigation system which may make use of terrain-referenced navigation (TRN) technology without requiring the use of a radar altimeter (RADALT) to monitor terrain beneath the aircraft like in typical TRN solutions. RADALTs, by design, require electromagnetic radiation to be emitted from the aircraft and reflections from targets to then be received at the aircraft, leading to a number of issues. Firstly, emitting electromagnetic radiation with sufficient intensity for reflections to be detected can require significant power consumption, which may be undesirable in applications where power supply is limited (e.g. battery-powered drones). Secondly, RADALTs can be vulnerable to interference—e.g. where an area is flooded with electromagnetic radiation at similar frequencies, whether intentionally (e.g. by another party) or by coincidence. Thirdly, radiation from RADALTs can interfere with, and be easily detected by other local systems like nearby aircraft or systems on the ground beneath the aircraft. In addition, a good quality RADALT can be expensive.

According to the present disclosure, a RADALT may not be necessary for measuring/estimating terrain heights. Instead, the present disclosure uses a camera to capture images of the terrain over time, and derives estimates of terrain height from those images, for comparison with a terrain map. This may help alleviate some of the above-mentioned issues with RADALTs, as cameras do not require emission of any electromagnetic radiation from the aircraft in order to function—though it will be appreciated of course that a camera could use a radiation source (e.g. a floodlight) mounted on the aircraft if so desired.

The camera may be downward-facing relative to the aircraft when the aircraft is flying horizontally, i.e. without pitching and without banking. The camera may be positioned substantially perpendicular to a longitudinal axis (i.e. a rolling or banking axis) and to a lateral axis of the aircraft. The lateral axis may also be considered to be the pitch axis of the aircraft.

In some examples, the navigation system may comprise an iterative algorithm unit (IAU) that determines a system state array in each iteration, the system state array (or system state vector) comprising a plurality of state variables; and the IAU, in each iteration, updates the system state array for the next iteration based on the current system state array, the first position estimate and the second position estimate, and generates the third position estimate based on the updated system state array. The IAU may provide a mechanism for the navigation system to continually estimate system variables (e.g. positions, velocities, accelerations, angular velocities, angular accelerations, etc.) based on the data available to the IAU, and thus may provide a computationally efficient technique for generating and continually updating the third position estimate as accurately as possible based on the first and second position estimates.

In some examples, each state variable comprises an estimate of an error associated with a corresponding system characteristic; and the IAU, in each iteration, generates the third position estimate by applying an error correction to the first position estimate based on the updated system state array. In other words, the system state array may comprise a system error state. This may enable the system to continually estimate errors on different system characteristics (e.g. velocities, accelerations, angular velocities, angular accelerations, etc.) and respond accordingly, e.g. by correcting measurements of system characteristics based on their associated estimated errors. It will be appreciated that such corrections may be additive or multiplicative or by otherwise weighting the measurement according to the estimated error.

In some examples, the system state array comprises at least one state variable associated with a signal output from the MEMS-IMU. Such examples may enable the system state array to provide a more comprehensive model of the overall system and may thus allow the IAU to output a more accurate third position estimate. The at least one state variable may comprise one or more of an alignment error, a scale factor error, a bias error, or any other appropriate error associated with a signal output by a MEMS-IMU. In some examples, the MEMS-IMU comprises one or more accelerometers and/or gyroscopes, and the system state array comprises at least one state variable corresponding to an alignment error, scale factor error, and/or a bias error of an accelerometer and/or gyroscope. In particularly advantageous arrangements, the system state array may comprise state variables corresponding to alignment error, scale factor error and bias error for each gyroscope and each accelerometer in the IMU.

In some examples, the INS comprises an integrator, and the system state array comprises at least one state variable associated with an operational parameter of the integrator. The integrator may enable the INS to calculate a velocity, angular velocity, or distance or angular orientation measurement from a linear acceleration or angular acceleration measurement from e.g. an accelerometer or gyroscope. For example the integrator may be any (or multiple) of: an integrator that integrates acceleration to provide velocity, an integrator that integrates velocity to provide position, an integrator that integrates angular acceleration to provide angular velocity and an integrator that integrates angular velocity to provide angle. Such integrators may be provided for each axis of detection, e.g. covering an x, y and z position/velocity and/or pitch, roll and yaw axes of rotations. Prior proposed solutions typically do not track operational parameters of integrators directly but instead only track a correction to be applied to the output of the integrator. Including a state variable associated with an operational parameter of the integrator (e.g. a coefficient of the integrator) can provide the navigation system with a more low level control of the system, operating at a deeper level of correction (or earlier in the processing chain) than previous systems, and thus produce a more accurate third position estimate. Of course corrections may additionally by tracked and applied to the output(s) of the integrator(s) for additional control and accuracy.

Thus, in some examples, the navigation system is arranged to control the integrator based on the current operational parameter of the integrator in the system state array.

This provision of a state variable associated with the integrator, and/or correction of an integrator directly, as outlined above, may be particularly advantageous in the context of this disclosure due to the use of a lower accuracy MEMS-IMU. The higher grade IMUs currently in use on high-spec systems have low enough errors that the existing systems of drift compensation/correction are adequate. However, with a MEMS-IMU, the accuracy is greatly reduced (for example a typical high grade MEMS-IMU can still be an order of magnitude lower in accuracy than a high spec non-MEMS IMU (e.g. around a tenth the accuracy). Accordingly, the correction/compensation of the MEMS-IMU outputs needs to be significantly better than is required for a standard high spec non-MEMS IMU. The integrator correction can provide or at least contribute significantly towards this improved correction/compensation.

In some examples, the system state array comprises greater than fifteen state variables, optionally at least twenty state variables, optionally at least thirty state variables, optionally at least forty state variables, optionally at least forty-five state variables. A typical navigation algorithm (e.g. a typical navigation Kalman filter) monitors up to fifteen state variables. However, the increased number of state variables discussed here, compared to prior proposed solutions, can provide the IAU with a more comprehensive overview of the system, and thus enables it to track more accurately how different state variables of the system change (or their errors in examples where the system state array comprises a system error state), potentially increasing the overall accuracy of the third position estimate. The increased number of state variables allows more system parameters and/or characteristics to be measured and determined. This allows more inaccuracies to be corrected. For example, although gyroscopes and accelerometers are mounted in the IMU as accurately as possible to ensure that they are aligned with their respective sense axes, there are necessarily misalignments that contribute to errors in the calculations and contribute to IMU drift over time. By modelling these errors and observing them, the IAU (e.g. Kalman filter) can estimate and correct for these errors, thereby improving the accuracy of the navigation solution. Thus, by increasing the complexity of the IAU to monitor more system state characteristics (i.e. by having a larger system state array), the overall system becomes more accurate and can further compensate for the inaccuracies of the MEMS IMU.

In some examples, the system state array comprises state variables corresponding to one or more of: up to three angle or tilt errors; up to three velocity errors; up to three position errors; up to three gyroscope bias errors; up to three accelerometer bias errors; up to four, or more, operational parameters or coefficients of integrators; up to three accelerometer scale factor errors; up to three gyroscope scale factor errors; up to six accelerometer alignment errors; up to six gyroscope alignment errors; and up to nine gyroscope acceleration- or g-sensitivity errors. In some examples, the angle or tilt errors may be expressed in a North, East, Down frame of reference, where the Down tilt is the heading error and the North and East tilts are roll and pitch errors translated to the North, East, Down frame of reference.

In some examples, the navigation system comprises a Kalman filter. In some examples, the IAU comprises a Kalman filter. Kalman filters are commonly used in navigation systems and thus make for relatively straightforward adaptation of existing systems. However, it will be appreciated that other types of iterative algorithm unit may be used in place of a Kalman filter. In particular, other linear quadratic estimators may be used. The navigation system may comprise a processor coupled to a computer-readable storage medium comprising instructions that, when executed by the processor, cause it to perform the functions of the INS, the O-TRN and the IAU. In other words, the INS, O-TRN and/or IAU may not be distinct hardware modules, but may be implemented as software modules within a single processor e.g. a CPU, FPGA, or any other appropriate processing means. In other examples, distinct hardware modules may be used or any mixture of hardware and software may be used.

The O-TRN may identify the terrain feature using standard image processing procedures including e.g. edge detection, cross-correlation, etc. The terrain feature may comprise an identifiable object in the image captured by the camera— e.g. a building, tree, hill, etc—and/or it may comprise a portion of, or the whole of, the image.

In some examples, the O-TRN identifies the terrain feature in two or more images captured by the camera, calculates a flow rate at which the terrain feature passes below the aircraft based on said two or more images, and derives the terrain height estimate based on the calculated flow rate. This process may be accomplished by performing a cross-correlation of two or more images to identify distances of high correlation (which correspond to terrain features common to both images). The flow rate in the images represents an angular rate at which the terrain is passing through the angular field of view of the camera. The closer the terrain is to the camera, the faster it will flow past the camera. Thus the flow rate of terrain in the image is correlated with the height of the camera (and thus the aircraft) above the terrain. By calculating the angular change of a terrain feature between two images captured by the camera, and combining with the distance travelled by the aircraft (obtainable from the aircraft velocity and the time between image captures), the height of the aircraft above the terrain can be calculated. The two or more images may be consecutive images captured by the camera or they may be non-consecutive (i.e. separated by one or more intervening frames) in order to select an appropriate distance for calculation.

Thus, it has been recognised that the flow rate of a terrain feature beneath an aircraft is dependent on two main factors: the height of the aircraft above the terrain in question, and the velocity of the aircraft. Thus, provided the altitude (i.e. height above sea level) and velocity of the aircraft can be estimated, and the flow rate of terrain can be measured, then the height of the terrain itself above sea level can also be estimated. Thus, in some examples, the INS outputs a first velocity estimate and a first altitude estimate based on one or more signals output by the MEMS-IMU, and the O-TRN derives the terrain height estimate further based on the first velocity estimate and the first altitude estimate. In some examples, the altitude estimate may not be output directly by the INS, but instead be generated using the IAU (although the altitude estimate is then still indirectly based on the first altitude estimate from the IMU). The altitude estimate may be generated without the use of a barometric altimeter, i.e. using only measurements from the MEMS-IMU and/or the system state array.

In some examples, the O-TRN identifies a plurality of terrain features in the image captured by the camera, and derives a terrain height estimate for each. The O-TRN may identify the plurality of terrain features in two or more images captured by the camera, calculate a respective flow rate at which each terrain feature passes below the aircraft based on said two or more images, and derives a terrain height estimate for each terrain feature based on its respective calculated flow rate. Thus it will be seen that the calculated flow rates, and therefore derived terrain height estimates, may vary across the images due to different parts of the terrain (e.g. hills, mountains, etc.) captured in a single image being at different elevations.

Purely inertial altitude estimates can be unstable, regardless of the type of IMU used, particularly due to decreased gravitational forces at higher altitudes. The lower accuracy of a MEMS IMU compared with a high spec navigation IMU means that the integrated altitude estimate is of even lower accuracy. This is a problem for TRN systems which require an accurate altitude above sea level in order to calculate accurate terrain heights for comparison with terrain map data. In high spec non-MEMS navigation IMUs in non-TRN applications (i.e. with no terrain-matching capabilities and typically no radar altimeter), some form of aiding is required to keep the altitude estimate stable. This often takes the form of a barometric altitude input. However, in TRN applications, the altitude calculation is often better when no account is taken of barometric pressure, i.e. when no barometric altitude measurement is factored into the calculation. The reason for this is that barometric altitude data tends to be slightly laggy compared with the integrated IMU altitude. Moreover, barometric pressure is affected by temperature which can change rapidly and unpredictably with height and weather. The height data obtained via the terrain matching process (e.g. via the radar altimeter and map database) is found to be sufficient to aid the high-spec INS altitude estimation and produce a height output of good accuracy. The inventor has found previously that when barometric altitude is used together with this, the overall result can be less accurate. However, the inventor has now found that when a MEMS IMU is used, barometric altitude can be used to improve the overall altitude calculation of the integrated navigation solution. Accordingly, in some examples, the navigation system further comprises a barometric altimeter, and the O-TRN derives the terrain height estimate further based on a second altitude estimate derived from an output of the barometric altimeter. This additional estimate of the aircraft's altitude increases the overall accuracy with which the O-TRN can estimate the height of the terrain feature, and thus increases the overall accuracy of the second position estimate, and thus also the third position estimate. The addition of barometric altitude may be sufficient to improve upon the height estimate of the MEMS IMU to allow the O-TRN to operate accurately. However, it has also been found to work well in combination with other improvements such as the direct control of integrators as discussed above and/or with other accuracy improvements discussed below.

In some examples, the O-TRN identifies a plurality of terrain features in a plurality of images captured by the camera, derives a respective terrain height estimate of each of the plurality of terrain features, and outputs the second position estimate based on a correlation between the plurality of terrain height estimates and terrain elevation data extracted from the terrain map. The O-TRN may derive a track of terrain height estimates along a travel path of the aircraft which it may then correlate with the terrain elevation data in order to output the second position estimate. Estimating the height of a plurality of terrain features in this manner may enable the O-TRN to provide a more accurate second position estimate, as it may provide the O-TRN with more data to compare to the terrain elevation data in the terrain map.

In some examples, the camera comprises a short-wave infra-red (SW-IR) camera. This may advantageously enable the camera to capture images of the terrain even through cloud cover and/or weather (e.g. precipitation) as SW-IR radiation is not significantly attenuated by water. This may enable the O-TRN to be used at higher aircraft altitudes, or in low visibility, without risking dropouts in terrain monitoring due to obscured vision thereof (which could be the case were the camera to operate only in the visible light range). The images captured by the camera may be two-dimensional. The camera may be configured to capture a series of images at any suitable frame-rate or frequency e.g. 30 Hz, 60 Hz, 144 Hz, etc. The camera may have a narrow field of view (e.g. between 0° and 60°) and thus capture images of a relatively small region of the terrain below the aircraft, in which case the O-TRN may identify one (or a small number of) terrain features per image. Equally, it may have a wide field of view (e.g. between 30° and 180°) and thus capture images of a relative large region of the terrain below the aircraft, in which case the O-TRN may identify a plurality of different terrain features in each image. Wider fields of view may advantageously enable the camera to capture at least a portion of the terrain below the aircraft even during manoeuvres, particularly pitching and rolling, and thus continually provide a navigation solution without relying on the aircraft flying substantially parallel to the ground. The field of view of the camera may be selected based on the expected pitch and roll of the aircraft, which will change depending on application. For example, a passenger or cargo aircraft may be expected to perform less extreme manoeuvres than e.g. an unmanned aircraft, and so would not require as large a field of view for the camera to reliably be able to capture images of the terrain below the aircraft during manoeuvres.

The pitch and roll of the aircraft (e.g. as obtained from the navigation system) may be used in the image capture and/or image processing processes to assist with identifying terrain features across sequential images. It will be appreciated that such pitch/roll processing is not necessary in order to identify the terrain features, but it can speed up the process by narrowing the image area where a likely match may be found.

When viewed from a second aspect this disclosure provides a method of navigating an aircraft. The method includes deriving a first position estimate based on one or more signals output by a microelectromechanical systems inertial measurement unit (MEMS-IMU); capturing, over time, a series of images of the terrain below the aircraft using a camera; identifying a terrain feature in an image captured by the camera; deriving a terrain height estimate of the terrain feature; deriving a second position estimate based on a comparison between the terrain height estimate and terrain elevation data extracted from a terrain map; and deriving a third position estimate based on the first position estimate and the second position estimate.

It will be appreciated that features of any aspect, embodiment or example described herein may, wherever appropriate, be applied to any other aspect, embodiment or example described herein. In particular, it will be appreciated that any features of the navigation system described above in relation to the first aspect may be equally applied to the method of the second aspect, and vice versa. Where reference is made to different embodiments or examples, it should be understood that these are not necessarily distinct but may overlap.

BRIEF DESCRIPTION OF THE DRAWINGS

One or more non-limiting examples will now be described, with reference to the accompanying drawings in which.

DETAILED DESCRIPTION OF THE DRAWINGS

Figure 1:
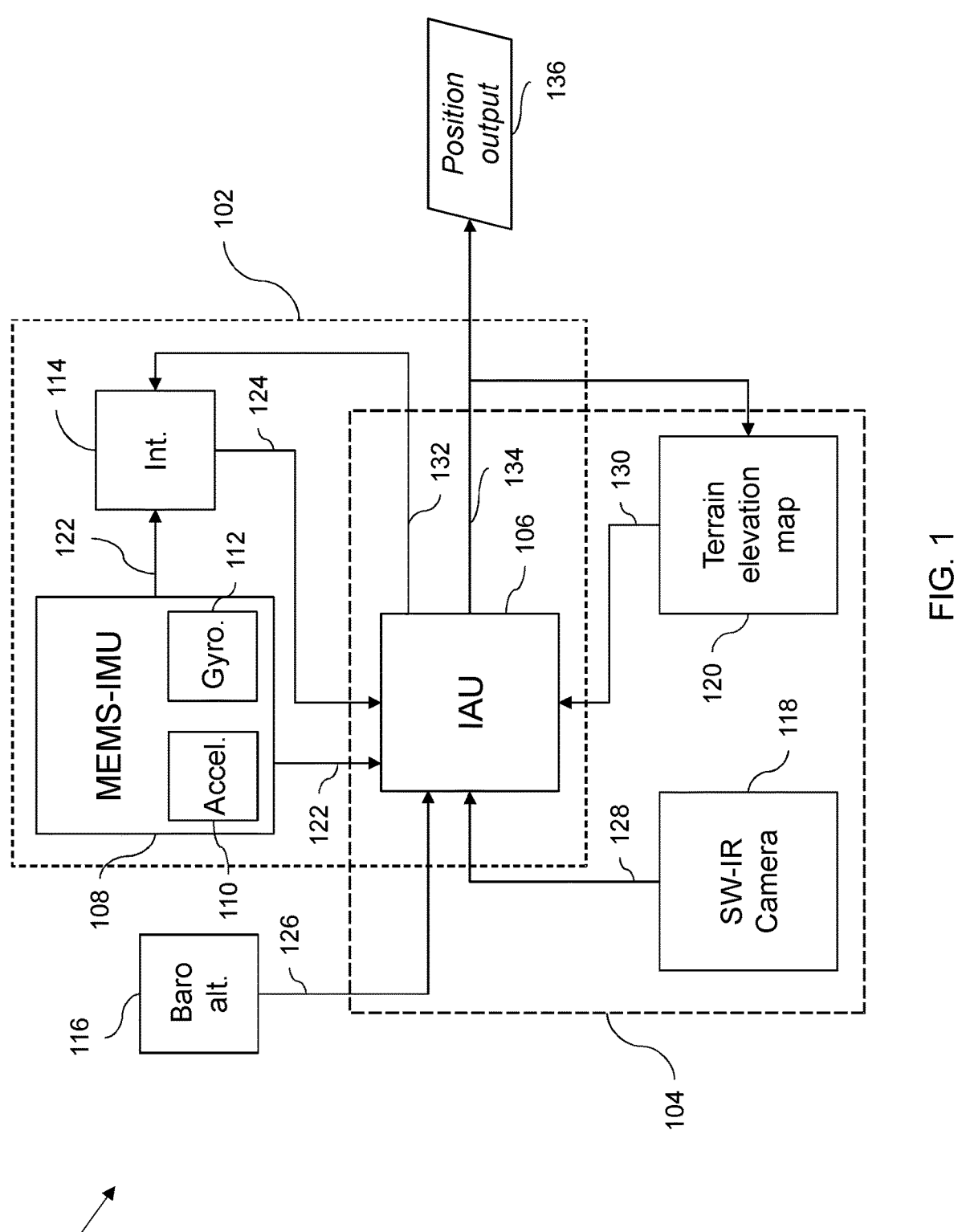
FIG. 1 is a schematic block diagram of a navigation system in accordance with the present disclosure.

FIG. 1 is a schematic block diagram of a navigation system 100 for an aircraft. The navigation system 100 comprises an iterative algorithm unit (IAU) 106, a micro-electromechanical systems inertial measurement unit (MEMS-IMU) 108, an integration block 114, a barometric altimeter 116, a short-wave infra-red (SW-IR) camera 118, and a terrain elevation map 120. The MEMS-IMU 108 comprises three MEMS accelerometers 110 positioned with their respective sensing axes orthogonal to each other, and three MEMS gyroscopes 112 positioned with their respective sensing axes orthogonal to each other. It will be appreciated that the principles outlined herein are not limited to this specific structure of MEMS-IMU 108, but may include any appropriate number of accelerometers and/or gyroscopes positioned in any appropriate manner.

The IAU 106, MEMS-IMU 108 and integration block 114 together form an inertial navigation system (INS) 102. The IAU 106, the SW-IR camera 118 and the terrain elevation map 120 together form an optical terrain-referenced navigation system (O-TRN) 104. It will be appreciated that while in this particular example the INS 102 and O-TRN 104 overlap, as the IAU 106 is shared between them, this is not limiting. In other examples, the INS 102 and O-TRN 104 be distinct modules whose outputs individually feed into the IAU 106. The barometric altimeter 116 may form part of an Air Data System (ADS) (not shown), though this is not required.

The MEMS-IMU 108, when fixed to an aircraft (either directly or gimballed), outputs signals 122 indicative of the aircraft's linear acceleration along the sensing axes of the accelerometers 110 and of the aircraft's angular acceleration around the sensing axes of the gyroscopes 112. These signals 122 are output directly to the IAU 106, and to the integration block 114. The integration block 114 comprises one or more integrators, possibly in a chain, that integrate the signals 122 output by the MEMS-IMU in order to generate one or more signals 124 indicative of the aircraft's velocity (by integrating linear acceleration), position (by integrating velocity), angular velocity (by integrating angular acceleration) and/or angular orientation (by integrating angular velocity). These signals 124 are output to the IAU 106. In this example, the integrators included in the integration block 114 are each configurable, as will be described in further detail later.

The barometric altimeter 116 comprises one or more air pressure sensors which measure atmospheric pressure, and outputs signals 126 indicative of the aircraft's altitude based on the outputs of the air pressure sensors. The barometric altimeter 116 could equally output raw pressure data 126 from the pressure sensors contained therein to the IAU 106.

The SW-IR camera 118 in this example is fixed to the aircraft on which the navigation system 100 is installed in a manner that allows it to capture images of the terrain below the aircraft. The SW-IR camera 118 captures images of the terrain below the aircraft and outputs these as terrain image data 128 to the IAU 106. In this example, the SW-IR camera 118 is downward facing relative to the aircraft when it is travelling horizontally without banking (i.e. substantially parallel to the Earth's surface). It could be positioned substantially orthogonal to the aircraft's longitudinal (roll) axis and lateral (pitch) axis, though this is not strictly necessary provided that the camera 118 is able to capture images of the terrain below the aircraft during normal use. In this example the camera 118 is a SW-IR camera 118 in order to enable it to capture images of the terrain below the aircraft through e.g. cloud cover, as SW-IR radiation is not significantly attenuated by clouds. However, it will be appreciated that any suitable camera could be used in place of the SW-IR camera 118.

The terrain elevation map 120 comprises a plurality of map posts, each map post comprising terrain elevation data (i.e. a height above sea level) for an area on the Earth's surface. In this example, each map post comprises terrain elevation data for an area of 30 m by 30 m on the Earth's surface. For example, DTED Level 2 provides terrain data with post spacings of 30 m. The terrain elevation map 120 may be stored using any appropriate storage means e.g. hard-disk drives (HDD), solid state drives (SSD), flash storage, etc. The terrain elevation map 120 outputs local terrain elevation data 130 to the IAU 106.

In this example, the IAU 106 is a Kalman filter that iteratively updates a system state array which is made up of a plurality of state variables, each variable in this example comprising an estimate of an error on a particular corresponding system characteristic (i.e. the Kalman filter in this example is an error-state Kalman filter, although this is not essential), based on the signals 122, 124, 126, 128 and 130 that it receives from the other components of the navigation system 100. Example system characteristics include but are not limited to acceleration along a particular axis, velocity along a particular axis, position along a particular axis, one or more coefficients (or operational parameters) of an integrator included in the integration block 114, altitude, alignment error (of a particular accelerometer 110 or gyroscope 112), scale-factor error (of a particular accelerometer 110 or gyroscope 112), bias error (of a particular accelerometer 110 or gyroscope 112), etc. In this particular example, the system state array includes more state variables (e.g. thirty-nine or forty-two state variables) than an equivalent state array of a typical navigation Kalman filter. For example, a typical navigation Kalman filter has a state array of twelve or fifteen variables. However, in order to extract sufficient accuracy from a MEMS IMU, it has been found to be beneficial to employ significantly more variables in the state array. In certain examples, the Kalman filter for use with a MEMS IMU may have at least twenty, at least thirty state variables, at least forty, or even at least forty-five state variables.

For example, in one example of a typical fifteen state navigation error-state Kalman filter, the state array includes variables corresponding to three (i.e. one corresponding to each axis) angle or tilt errors, three velocity errors, three position errors, three gyroscope bias errors and three accelerometer bias errors, giving fifteen variables total. By contrast, in examples of the present disclosure with a MEMS-IMU 108, the state array may include variables corresponding to one or more of these errors, and may additionally include variables corresponding to one or more of the following: four or more operational parameters or coefficients of integrators included in the integration block 114 (e.g. two for linear acceleration measurements from accelerometers 110 and two for angular acceleration measurements from gyroscopes 112), three accelerometer scale factor errors (one for each accelerometer), three gyroscope scale factor errors (one for each gyroscope), six accelerometer alignment or misalignment errors (two for each accelerometer as each can be misaligned in two off-axis directions), six gyroscope alignment or misalignment errors (two for each gyroscope as each can be misaligned in two off-axis directions), and nine gyroscope acceleration- or g-sensitivity errors (three for each gyroscope which can have different acceleration sensitivities for each axis). In examples of the present disclosure, angle or tilt errors may be expressed in a North, East, Down frame of reference, where the Down tilt is the heading error and the North and East tilts are the roll and pitch errors translated to the North, East, Down frame of reference.

The IAU 106 uses the signals 122, 124 and 126 from the other components of the INS 102 to generate a first position estimate using the principles of dead reckoning. The first position estimate includes an estimate of the aircraft's altitude (a "vertical" position coordinate)—e.g. height above sea level, as well as "horizontal" position coordinates e.g. latitude and longitude. This first position estimate can be considered to be an inertial position estimate generated by the INS 102.

The IAU 106 also uses the image data 128 from the camera 118 in combination with the local terrain elevation data 130 from the terrain elevation map 120 in order to generate a second position estimate, as will be described in further detail later with reference to FIG. 2. This second position estimate can be considered to be a terrain-referenced position estimate generated by the O-TRN 104.

In each iteration, the IAU 106, based on the first position estimate, the second position estimate and the current system state array, generates a third, current position estimate 134 which it outputs to a position output 136, which may be communicated to a further system of the aircraft on which the navigation system 100 is installed, e.g. a navigation display, aircraft controller, etc. The current position estimate 134 is also output to the terrain elevation map 120 which can use this position estimate 134 to determine local terrain elevation data 130 (i.e. terrain elevation data near to the current position estimate 134 of the aircraft), which it then outputs to the IAU 106.

The IAU 106 also outputs one or more integrator control signals 132 to the integration block 114 which control one or more coefficients or operational parameters of the integrators contained therein. The integrator control signals 132 are generated based on the current system state array, particularly the state variables associated with the integrators in the integration block 114. This enables the IAU 106 to directly configure the integrators in the integration block 114 in order to correct for any errors therein, rather than retrospectively correct the signals output 124 by these integrators. It has been found that directly configuring the integrators in the integration block 114 in this manner allows the INS 102 to compensate for the inherent errors and drift of the MEMS-IMU 108 much better than simply applying corrections subsequent to the integrators. This improves the accuracy of the first position estimate generated by the INS 102.

Figure 2:
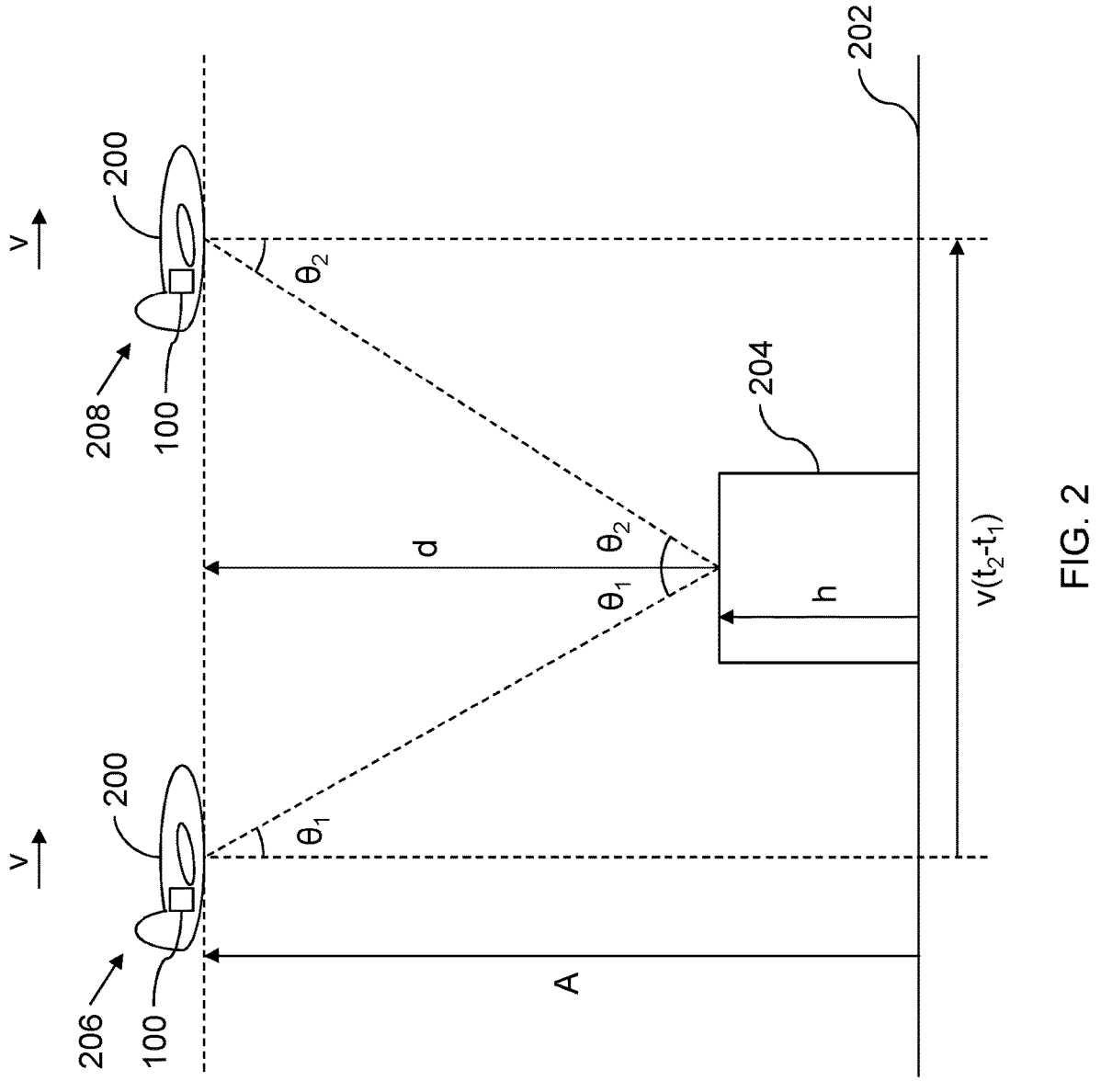
FIG. 2 is a simplified diagram illustrating the principles behind using a camera to estimate the height of terrain.

FIG. 2 is a simplified, not-to-scale diagram illustrating the principles behind how the camera 118 and terrain elevation map 120 can be used to generate the second position estimate mentioned previously. FIG. 2 shows an aircraft 200 on which the navigation system 100 of FIG. 1 is installed. FIG. 2 also shows sea level 202 on the Earth's surface, and a terrain item 204. The terrain item 204 could be any area of terrain e.g. a hill, a mountain, a building, etc. It will be appreciated that the terrain item 204 is merely representative and in reality would likely not feature a flat upper surface as shown in FIG. 2. The terrain item 204 has a height or elevation h above sea level 202. The vertical separation d between the aircraft 200 and the upper surface of the terrain item 204—i.e. the vertical component of the distance between the aircraft 200 and the upper surface of the terrain item 204—remains substantially constant in this example as the aircraft 200 is neither ascending or descending (although it will be appreciated that such manoeuvres can be factored in to the calculation straightforwardly).

The aircraft 200 is flying at a constant velocity v in a straight line, at substantially parallel to the Earth's surface (i.e. horizontal), and therefore remains at a substantially constant altitude A above sea level 202. During flight, the aircraft 200 passes over the terrain item 204. At a first time t1 the aircraft 200 is at a first position 206, and at a second time t2 the aircraft 200 is at a second position 208.

At the first time t1, the camera 118 captures a first image of the terrain below the aircraft 200, including the terrain item 204. At the second time t2, the camera 118 captures a second image of the terrain below the aircraft 200, again including the terrain item 204. At the first time t1, the location of the upper surface of the terrain item 204 forms a first angle θ1, relative to vertical, between it and the aircraft 200. At the second time t2, the location of the upper surface of the terrain item 204 forms a second angle θ2, relative to vertical, between it and the aircraft 200. The horizontal distance travelled by the aircraft 200 between the first time t1 and the second time t2 is given by v(t2−t1).

It will therefore be appreciated that the terrain item 204 will have moved through an angle θ1+θ2 across the field of view of the camera 118 in the time t2−t1 between the moment the first image is captured by the camera 118 and the moment the second image is captured by the camera 118. As the camera 118 is pointing in a substantially constant direction, this angle change is observable in the two images captured by the camera 118 by considering the location of the terrain item 204 in the images captured by the camera 118, as are the individual angles θ1 and θ2. Essentially, each pixel in the image represents a different angle of incident light and therefore by determining the number of pixels that a terrain feature has moved across the image (i.e. across the camera sensor), the angle that the terrain feature has moved can be calculated.

Using trigonometry, the distance travelled by the aircraft between the times t1 and t2 is given by v(t2−t1)=d tan(θ1)+d tan(θ2). Thus, the vertical separation d between the upper surface of the terrain item 204 and the aircraft 200 is given by d=v(t2−t1)/(tan(θ1)+tan(θ2)). As the altitude A of the aircraft 200 is given by A=d+h, it therefore follows that h=A−v(t2−t1)/(tan(θ1)+tan(θ2)).

It will be appreciated therefore that the height h of the terrain item 204 is dependent on the altitude A of the aircraft 200, the velocity v of the aircraft 200, the time between camera frames (which is dependent on the frame-rate of camera 118), and the position of the terrain item 204 in the images captured by the camera 118. The altitude A and velocity v of the aircraft 200 can be estimated using the INS 102, the time between camera frames is either known or controllable depending on the configuration of the camera 118, and the position of the terrain item 204 in images captured by the camera 118 is observable using standard image processing techniques and known variables of the camera 118 e.g. field-of-view. Thus, it will be appreciated that the INS 102 and the O-TRN 104 shown in FIG. 1 can be used to estimate the height h of the terrain feature 204. The altitude A of the aircraft 200 may not need to be continually updated based on measurements thereof (e.g. using the barometric altimeter 116 shown in FIG. 1): instead, the IAU 106 may be fed with an initial estimate of the altitude A which it may then continually update based on the system state array.

It will also be appreciated that while FIG. 2 shows a large time gap between image captures, and therefore large angle changes, the principles outlined above are readily applicable to smaller time gaps and smaller angle changes. Thus, it will be appreciated by those skilled in the art that the principles outlined above can be readily modified in order to take account of the rate at which the terrain item 204 passes across the field-of-view of the camera 118—i.e. an angular speed or velocity. This is also referred to herein as flow rate.

In this example, the camera 118 continually captures images of the terrain below the aircraft 200, and thus outputs a series of images over time. The IAU 106 receives these images and continually performs cross-correlation therebetween. This enables the IAU 106 to identify terrain features that are shared between more than one image, to calculate the angular change of those features between images, and therefore calculate the flow rate—i.e. the angular speed/velocity across the field-of-view of the camera 118—of those terrain features. It will be appreciated that a single image will typically capture multiple portions of terrain at varying heights, and that the calculated flow rate will therefore typically vary across different portions of the images.

In some examples, the IAU 106 calculates flow rate across its entire field-of-view, and thus the entire field-of-view of the camera 118 can be considered to be a terrain feature. In other examples, the IAU 106 calculates flow rate for one or more different areas or regions of the images, and thus each of these areas can be considered to be a terrain feature. Such areas or regions may be identified as areas which produce correlation coefficients that exceed a predetermined value or are greater than other areas or regions. In other examples, the IAU 106 identifies specific terrain items in each image using e.g. edge detection, and calculates a flow rate for each, and therefore each terrain item identified in an image can be considered to be a terrain feature.

The calculated flow rate(s) are then used to calculate estimates of the terrain height (or changes or variations in the terrain height). These estimates are then correlated with the terrain elevation data 130 received from the terrain elevation map 120 in order to produce the second position estimate of the position of the aircraft 200. This second position estimate is used to update the system state array in each iteration, and thus improve the accuracy of the current, third position estimate 134 output by the IAU 106.

Figure 3:
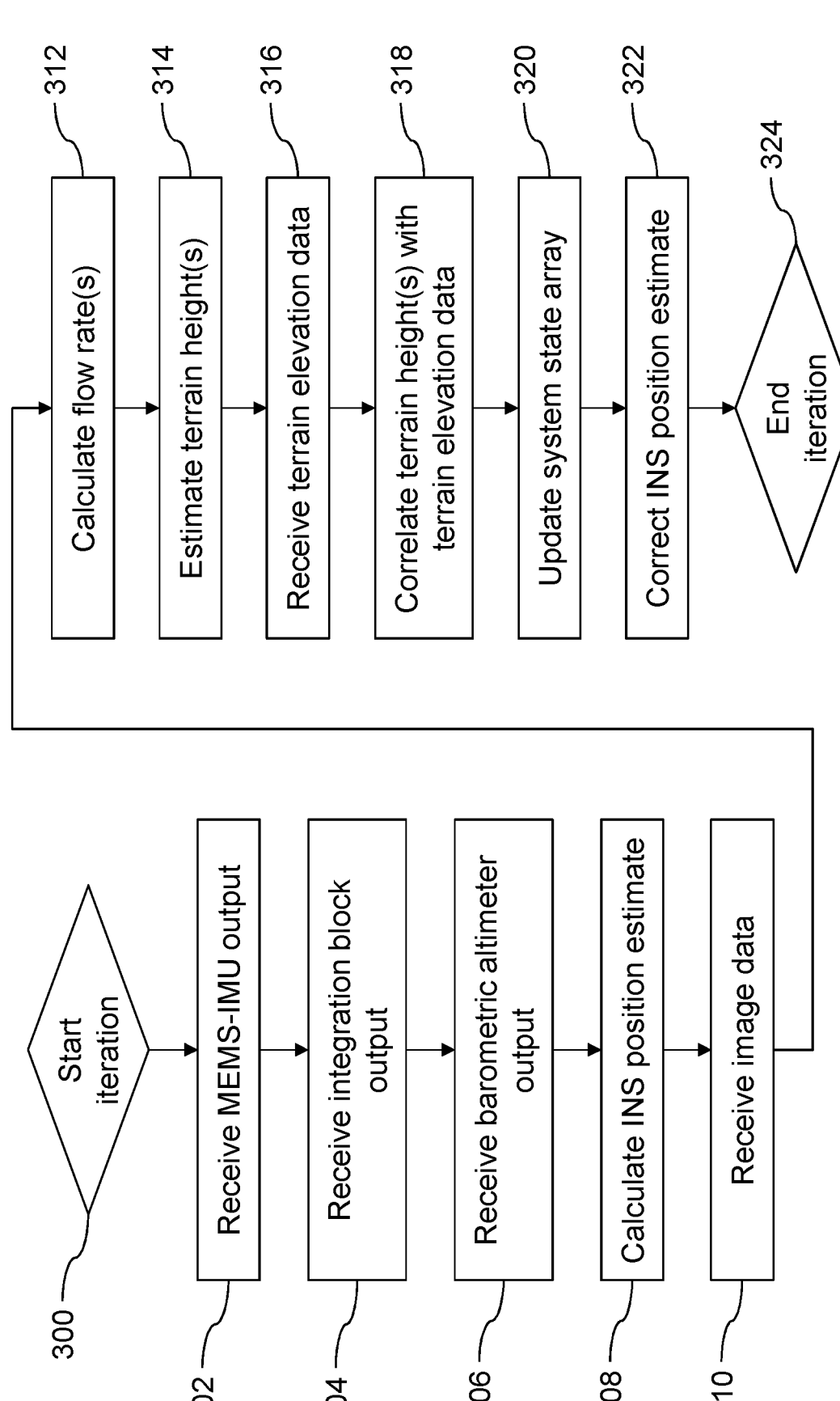
FIG. 3 is a flow-chart illustrating an example iterative loop of the iterative algorithm unit shown in FIG. 1.

FIG. 3 is a flow diagram illustrating, in a simplistic form, the operation of the IAU 106. While the various steps of FIG. 3 are shown in a particular order, this order is not limiting and the IAU 106 may perform these steps in any appropriate order. It may also perform additional and/or fewer steps, depending on implementation.

Step 300 indicates the start of an iteration. At step 302, the IAU 106 receives the output 122 of the MEMS-IMU 108

(e.g. the raw sensor data). At step 304, the IAU 106 receives the output 124 of the integration block 124 (e.g. integrated velocity and/or integrated position/orientation). At step 306, the IAU 106 receives the output 126 of the barometric altimeter 116. At step 308, the IAU 106 calculates a first position estimate (also referred to as the INS position estimate) from these received outputs, using dead-reckoning.

At step 310, the IAU 106 receives the image data 128 from the camera 118. At step 312, the IAU 106 performs the above-mentioned image cross-correlation between images captured by the camera 118 and calculates flow rates of one or more terrain features identified in those images (where a terrain feature can be a whole of an image or, a portion of an image, or an identifiable feature in an image). At step 314, the IAU 106 estimates one or more terrain heights (or terrain height changes) from the calculated flow rates, as explained previously. At step 316, the IAU 106 receives local terrain elevation data 130 from the terrain elevation map 120. At step 318, the IAU 106 correlates estimated terrain heights with the terrain elevation data 130 that it receives from the terrain elevation map 120, and generates a second position estimate based on the result of the correlation. The second position estimate may be determined to be the position which gives the greatest correlation coefficient. At step 320, the IAU 106 updates the system state array based on all the data it receives from the other components of the navigation system 100, the first position estimate and the second position estimate. At step 322, the IAU 106 corrects the INS position estimate (i.e. the first position estimate) based on the system state array, which in this example is a system error state as explained previously. The corrected INS position estimate is the current, third position estimate 134 that is then output by the IAU 106. At step 324, the iteration ends, and the IAU 106 returns to step 300 where it begins a new iteration.

The various methods described herein may be implemented by one or more computer program products or computer readable media provided on one or more devices. The computer program product or computer readable media may include computer code arranged to instruct a computer or a plurality of computers to perform the functions of one or more of the various methods described herein. The computer program and/or the code for performing such methods may be provided to an apparatus, such as a computer, on a computer readable medium or computer program product. The computer readable medium may be transitory or non-transitory. The computer readable medium could be, for example, an electronic, magnetic, optical, electromagnetic, infrared, or semiconductor system, or a propagation medium for data transmission, for example for downloading the code over the Internet. Alternatively, the computer readable medium could take the form of a physical computer readable medium such as semiconductor or solid state memory, magnetic tape, a removable computer diskette, a random access memory (RAM), a read-only memory (ROM), a rigid magnetic disc, and an optical disk, such as a CD-ROM, CD-R/W or DVD. An apparatus such as a computer may be configured in accordance with such code to perform one or more processes in accordance with the various methods discussed herein. Such an apparatus may take the form of a data processing system. Such a data processing system may be a distributed system. For example, such a data processing system may be distributed across a network.

It will be appreciated by those skilled in the art that this disclosure has been illustrated by describing one or more specific examples thereof, but is not limited to these examples; many variations and modifications are possible, within the scope of the accompanying claims.

The invention claimed is:

1. A navigation system for an aircraft, comprising:
   a microelectromechanical systems inertial measurement unit (MEMS-IMU);
   a camera arranged to capture, over time, a series of images of the terrain below the aircraft;
   a terrain map comprising terrain elevation data;
   an inertial navigation system (INS) arranged to generate a first position estimate based on one or more signals output by the MEMS-IMU; and
   an optical terrain-referenced navigation unit (O-TRN) configured to:
      identify a terrain feature in two or more images captured by the camera;
      calculate a flow rate at which the terrain feature passes below the aircraft based on said two or more images;
      derive a terrain height estimate of the terrain feature based on the calculated flow rate; and
      generate a second position estimate based on a comparison between the terrain height estimate and terrain elevation data extracted from the terrain map,
   wherein the navigation system is configured to generate a third position estimate based on the first position estimate and the second position estimate.

2. The navigation system as claimed in claim 1, wherein the navigation system further includes:
   an iterative algorithm unit (IAU) arranged to determine a system state array in each iteration, the system state array comprising a plurality of state variables, wherein the IAU is configured, in each iteration, to:
   update the system state array for the next iteration based on the current system state array, the first position estimate and the second position estimate; and
   generate the third position estimate based on the updated system state array.

3. The navigation system as claimed in claim 2, wherein:
   each state variable comprises an estimate of an error associated with a corresponding system characteristic; and
   the IAU is arranged, in each iteration, to generate the third position estimate by applying an error correction to the first position estimate based on the updated system state array.

4. The navigation system as claimed in claim 2, wherein:
   the MEMS-IMU comprises one or more accelerometers and/or gyroscopes; and
   the system state array comprises at least one state variable corresponding to an alignment error, scale factor error, and/or a bias error of an accelerometer and/or gyroscope.

5. The navigation system as claimed in claim 2, wherein:
   the INS comprises an integrator; and
   the system state array comprises at least one state variable associated with an operational parameter of the integrator.

6. The navigation system as claimed in claim 5, wherein the navigation system is arranged to control the integrator based on the current state variable associated with the operational parameter of the integrator in the system state array.

7. The navigation system as claimed in claim 2, wherein the system state array comprises state variables corresponding to one or more of:
   up to three angle or tilt errors;

up to three velocity errors;

up to three position errors;

up to three gyroscope bias errors;

up to three accelerometer bias errors;

up to four, or more, operational parameters or coefficients of integrators;

up to three accelerometer scale factor errors;

up to three gyroscope scale factor errors;

up to six accelerometer alignment errors;

up to six gyroscope alignment errors; and up to nine gyroscope acceleration- or g-sensitivity errors.

8. The navigation system as claimed in claim 2, wherein the IAU comprises a Kalman filter.

9. The navigation system as claimed in claim 1, wherein:

the INS is arranged to output a first velocity estimate and a first altitude estimate based on one or more signals output by the MEMS-IMU; and the O-TRN is arranged to derive the terrain height estimate further based on the first velocity estimate and the first altitude estimate.

10. The navigation system as claimed in claim 1, further comprising:

a barometric altimeter;

wherein the O-TRN is arranged to derive the terrain height estimate further based on a second altitude estimate derived from an output of the barometric altimeter.

11. The navigation system as claimed in claim 1, wherein the O-TRN is configured to:

identify a plurality of terrain features in a plurality of images captured by the camera;

derive a respective terrain height estimate of each of the plurality of terrain features; and output the second position estimate based on a correlation between the plurality of terrain height estimates and terrain elevation data extracted from the terrain map.

12. The navigation system as claimed in claim 2, wherein:

the system state array comprises greater than fifteen state variables, optionally at least twenty state variables, optionally at least thirty state variables, optionally at least forty state variables, optionally at least forty-five state variables.

13. The navigation system as claimed in claim 1, wherein the camera comprises a short-wave infra-red camera.

14. A method of navigating an aircraft, the method comprising:

deriving a first position estimate based on one or more signals output by a microelectromechanical systems inertial measurement unit (MEMS-IMU);

capturing, over time, a series of images of the terrain below the aircraft using a camera;

identifying a terrain feature two or more images captured by the camera;

calculating a flow rate at which the terrain feature passes below the aircraft based on said two or more images;

deriving a terrain height estimate of the terrain feature based on the calculated flow rate;

deriving a second position estimate based on a comparison between the terrain height estimate and terrain elevation data extracted from a terrain map; and deriving a third position estimate based on the first position estimate and the second position estimate.

* * * * *